(12) United States Patent
Baptist et al.

(10) Patent No.: US 11,620,232 B2
(45) Date of Patent: *Apr. 4, 2023

(54) ASSOCIATING A PROCESSING THREAD AND MEMORY SECTION TO A MEMORY DEVICE

(71) Applicant: International Business Machines Corporation, Armonk, NY (US)

(72) Inventors: Andrew D. Baptist, Mt. Pleasant, WI (US); Yogesh R. Vedpathak, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/367,106

(22) Filed: Mar. 27, 2019

(65) Prior Publication Data
US 2019/0220415 A1   Jul. 18, 2019

Related U.S. Application Data

(63) Continuation of application No. 15/631,453, filed on Jun. 23, 2017, now Pat. No. 10,324,855.

(51) Int. Cl.
*G06F 12/10* (2016.01)
*G06F 12/1072* (2016.01)
(Continued)

(52) U.S. Cl.
CPC .............. *G06F 12/10* (2013.01); *G06F 3/061* (2013.01); *G06F 3/067* (2013.01); *G06F 3/0659* (2013.01);
(Continued)

(58) Field of Classification Search
CPC .... G06F 11/1076; G06F 3/067; G06F 3/0659; G06F 12/10; G06F 3/061; G06F 12/1072; G06F 12/1081; G06F 12/109
(Continued)

(56) References Cited

U.S. PATENT DOCUMENTS 4,092,732 A   5/1978   Ouchi
5,454,101 A   9/1995   Mackay et al.
(Continued)

OTHER PUBLICATIONS

M. Liu, W. Ji, J. Li and X. Pu, "Storage Architecture for an On-chip Multi-core Processor," 2009 12th Euromicro Conference on Digital System Design, Architectures, Methods and Tools, Patras, 2009, pp. 263-270.*

(Continued)

*Primary Examiner* — Pierre Michel Bataille
(74) *Attorney, Agent, or Firm* — Randy Emilio Tejeda; Andrew D. Wright; Calderon Safran & Cole P.C.

(57) ABSTRACT

A method begins by a storage unit of a dispersed storage network (DSN) receiving access requests which include a logical DSN address and a storage function. The method continues with a first processing module of the storage unit performing logical to physical address conversions of logical DSN addresses of the access requests to physical addresses of a plurality of main memories. For a first access request of the access requests, the method continues with the first processing module identifying a first main memory based on the physical address resulting from the physical address conversion. The method continues with the first processing module identifying a first processing thread of a plurality of processing threads based on allocation of the plurality of processing threads to the plurality of main memories. The method continues with the first processing thread executing tasks of the first access request to fulfill the first access request.

20 Claims, 7 Drawing Sheets

(51) Int. Cl.
*G06F 3/06* (2006.01)
*G06F 11/10* (2006.01)
*G06F 12/1081* (2016.01)
*G06F 12/109* (2016.01)

(52) U.S. Cl.
CPC ...... *G06F 11/1076* (2013.01); *G06F 12/1072* (2013.01); *G06F 12/109* (2013.01); *G06F 12/1081* (2013.01); *G06F 2212/1016* (2013.01); *G06F 2212/154* (2013.01); *G06F 2212/263* (2013.01)

(58) Field of Classification Search
USPC .......................................... 711/141, 169, 114
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,003,066 A | 12/1999 | Ryan et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,490,671 B1 * | 12/2002 | Frank ................... | G06F 12/1027 711/202 |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,972,692 B2 * | 3/2015 | Leggette ............. | G06F 11/1076 711/170 |
| 10,324,855 B2 | 6/2019 | Baptist et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0039002 A1 * | 2/2007 | McDonald ............ | G06F 9/4881 718/102 |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2008/0005529 A1 * | 1/2008 | Morris ................ | G06F 12/1036 711/207 |
| 2008/0229308 A1 * | 9/2008 | Wyman ................ | G06F 9/3851 718/100 |
| 2009/0094251 A1 | 4/2009 | Gladwin et al. | |
| 2009/0094318 A1 | 4/2009 | Gladwin et al. | |
| 2009/0198891 A1 * | 8/2009 | Arimilli ................ | G06F 12/10 711/118 |
| 2010/0023524 A1 | 1/2010 | Gladwin et al. | |
| 2013/0018928 A1 * | 1/2013 | Lacapra ................ | H04L 67/104 707/822 |
| 2013/0151809 A1 | 6/2013 | Maruyama | |
| 2013/0191651 A1 | 7/2013 | Muff et al. | |
| 2014/0207871 A1 | 7/2014 | Miloushev et al. | |
| 2015/0067100 A1 * | 3/2015 | Peake ................. | G06F 11/1096 709/217 |
| 2015/0100966 A1 * | 4/2015 | Baptist ................. | G06F 3/0619 718/103 |
| 2016/0179581 A1 * | 6/2016 | Soundararajan ...... | G06F 9/5033 718/104 |
| 2017/0147499 A1 * | 5/2017 | Mohan ................. | G06F 12/10 |
| 2017/0192699 A1 * | 7/2017 | Iljazi .................... | G06F 3/0653 |
| 2017/0286222 A1 * | 10/2017 | Resch ................. | G06F 11/3034 |
| 2018/0059984 A1 * | 3/2018 | Baptist ................. | G06F 3/0635 |
| 2018/0285110 A1 * | 10/2018 | Ray ...................... | G09G 5/363 |
| 2018/0373640 A1 * | 12/2018 | Baptist ................. | G06F 12/1072 |

OTHER PUBLICATIONS

M. Mao et al., "TEMP: Thread batch enabled memory partitioning for GPU," 2016 53nd ACM/EDAC/IEEE Design Automation Conference (DAC), 2016, pp. 1-6.*

E. H. Molina da Cruz, M. A. Zanata Alves, A. Carissimi, P. O. A. Navaux, C. P. Ribeiro and J. -F. Mehaut, "Using Memory Access Traces to Map Threads and Data on Hierarchical Multi-core Platforms," 2011 IEEE International Symposium on Parallel and Distributed Processing Workshops and Phd Forum, 2011.*

J. Rao, K. Wang, X. Zhou and C. -Z. Xu, "Optimizing virtual machine scheduling in NUMA multicore systems," 2013 IEEE 19th International Symposium on High Performance Computer Architecture (HPCA), 2013, pp. 306-317.*

Chung; An Automatic Data Segmentation Method for 3D Measured Data Points; National Taiwan University; pp. 1-8; 1998.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(56) References Cited

OTHER PUBLICATIONS

Legg; Lightweight Directory Access Protocol (LDAP): Syntaxes and Matching Rules; IETF Network Working Group; RFC 4517; Jun. 2006; pp. 1-50.
Plank, T1: Erasure Codes for Storage Applications; FAST2005, 4th Usenix Conference on File Storage Technologies; Dec. 13-16, 2005; pp. 1-74.
Rabin; Efficient Dispersal of Information for Security, Load Balancing, and Fault Tolerance; Journal of the Association for Computer Machinery; vol. 36, No. 2; Apr. 1989; pp. 335-348.
Satran, et al.; Internet Small Computer Systems Interface (iSCSI); IETF Network Working Group; RFC 3720; Apr. 2004; pp. 1-257.
Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): String Representation of Search Filters; IETF Network Working Group; RFC 4515; Jun. 2006; pp. 1-12.
Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
List of IBM Patents or Patent Applications Treated as Related, dated Aug. 17, 2020, 1 page.

\* cited by examiner

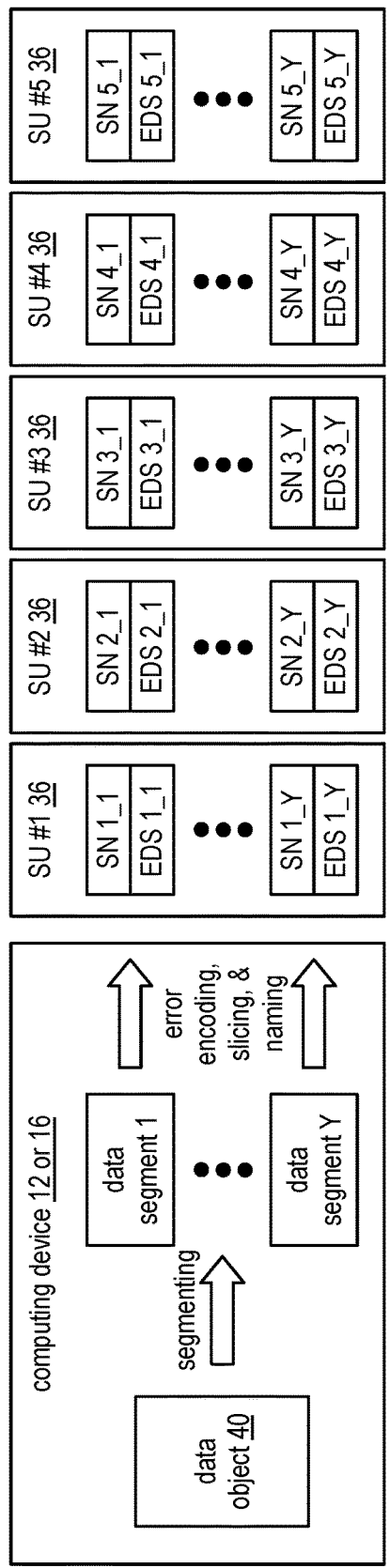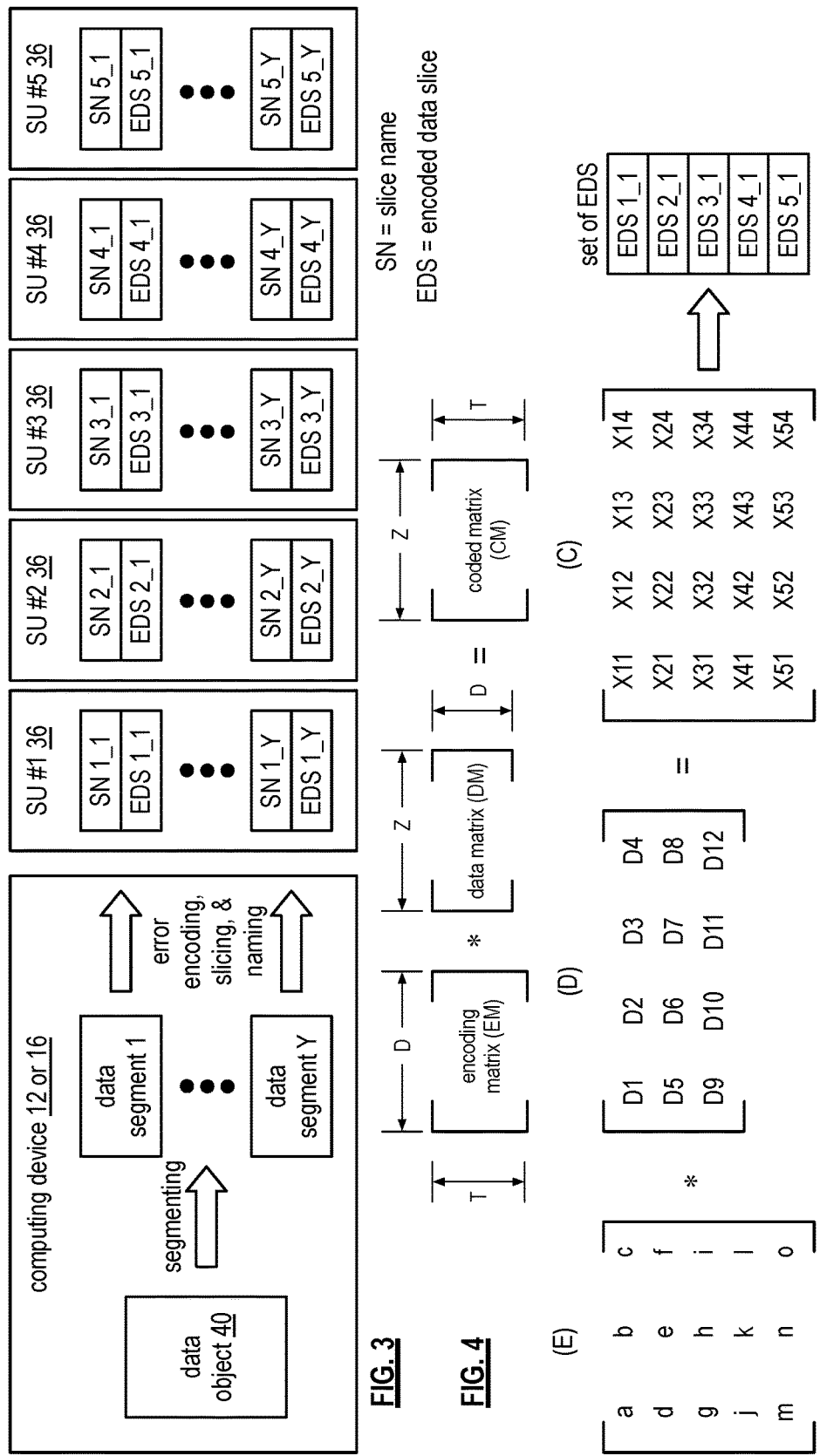

US 11,620,232 B2

ASSOCIATING A PROCESSING THREAD AND MEMORY SECTION TO A MEMORY DEVICE

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

As if further known, some processes may utilize multiple processing threads to make greater use of multiple processing cores or central processing units (CPUs). In general, each processing thread will be used for a single type of task. For example, a first processing thread performs all first tasks of different process, a second processing thread performs all second tasks of the different processes and a third processing thread performs all third tasks of the different processes.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
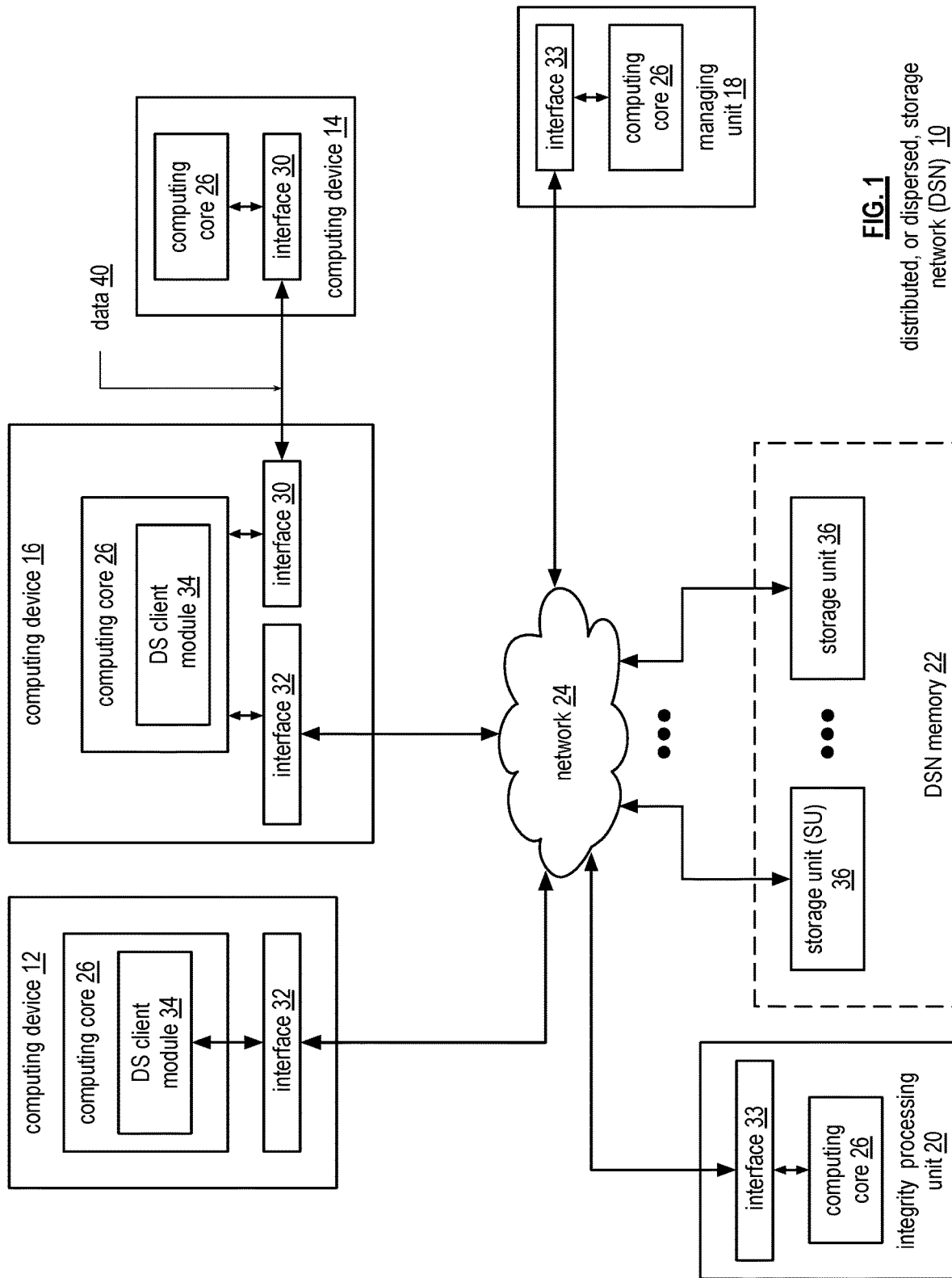
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
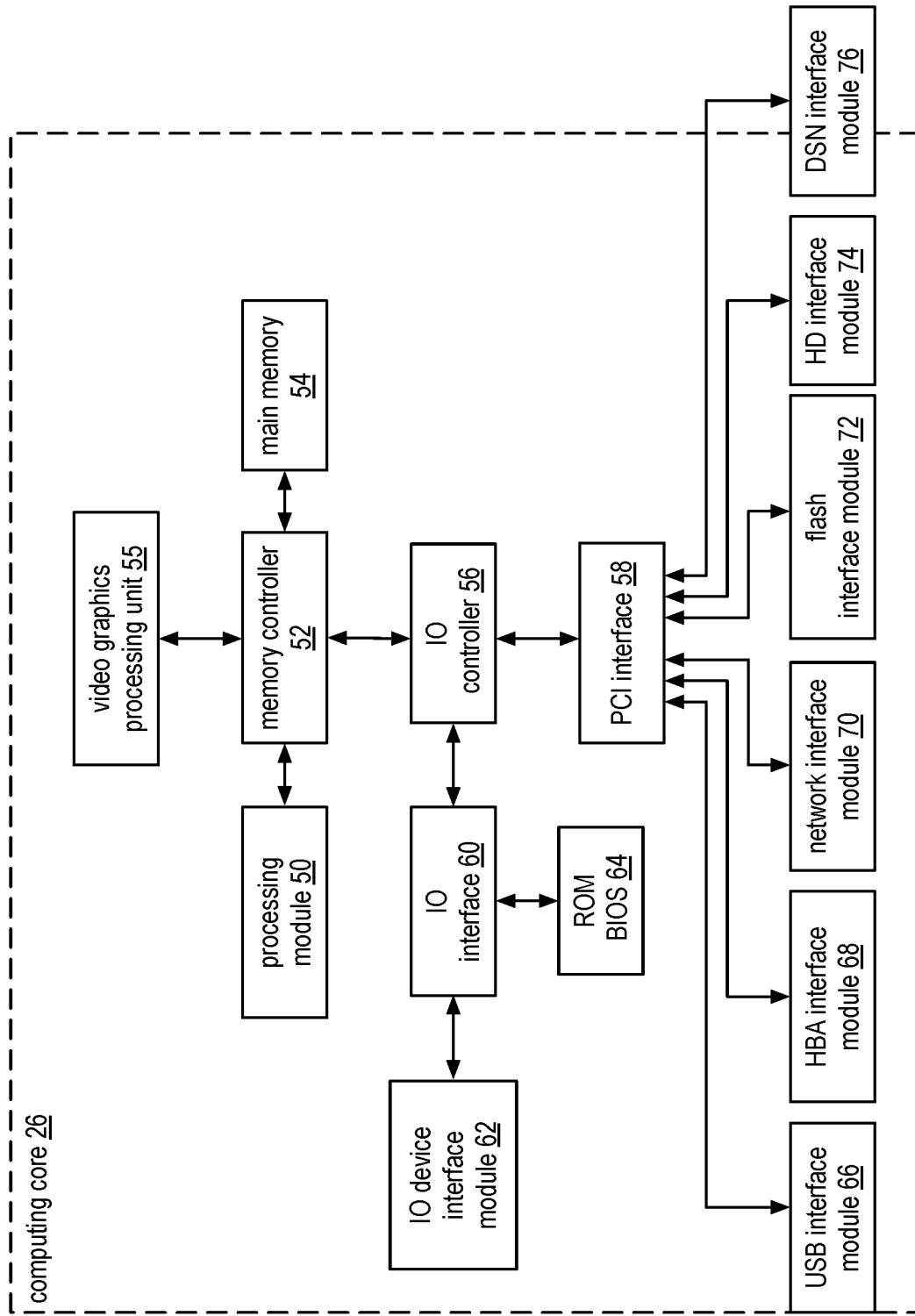
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data 40 as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
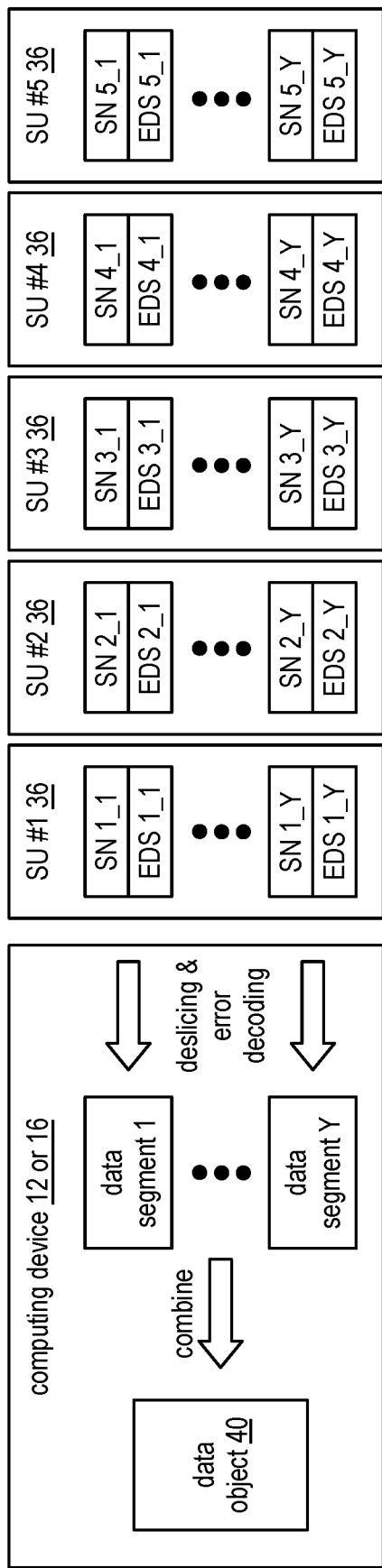
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
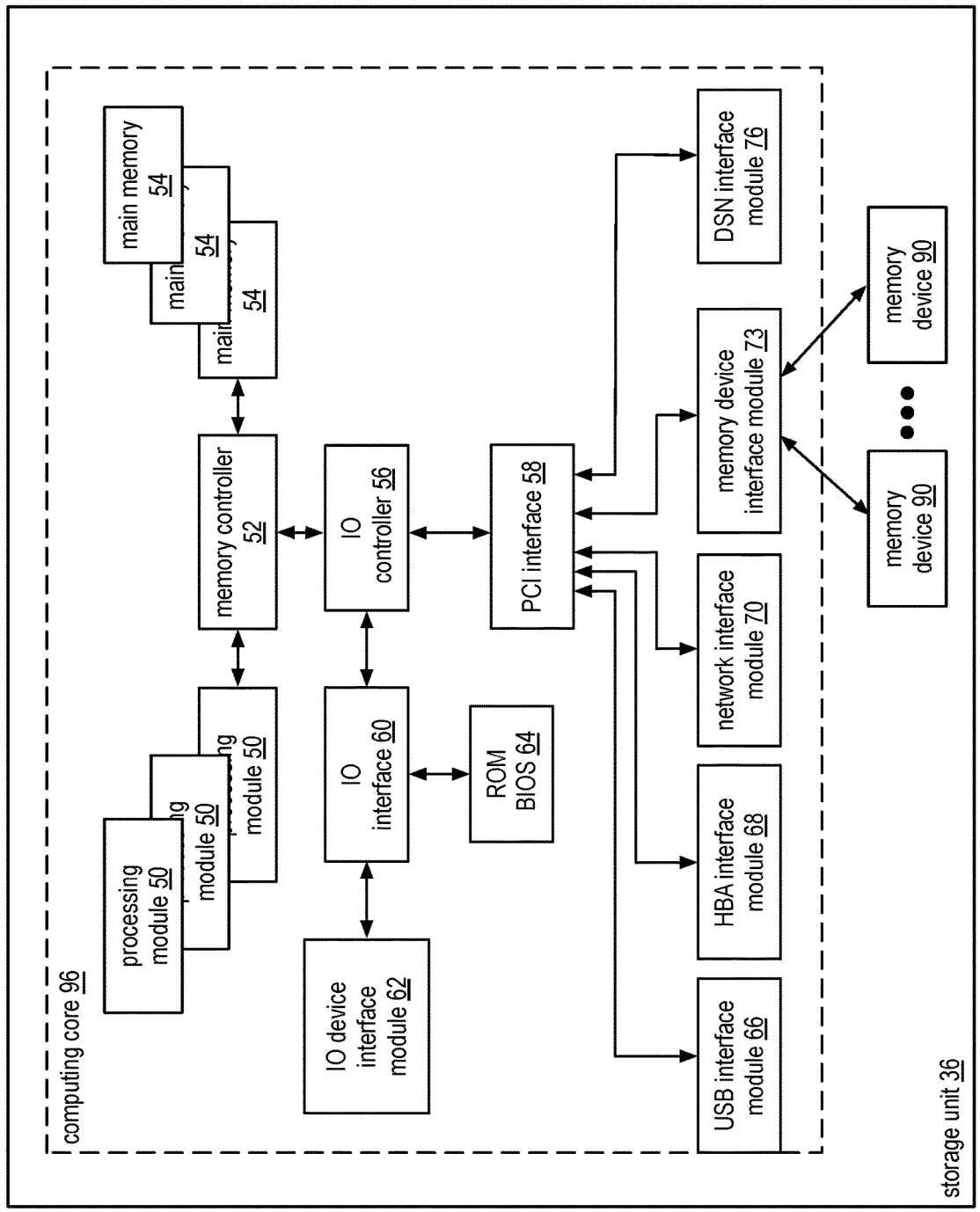
FIG. 9 is a schematic block diagram of an embodiment of storage unit in accordance with the present invention.

FIG. 9 is a schematic block diagram of an embodiment of storage unit that includes a computing core 96 and a plurality of memory devices. The computing core 96 may function as the computing core 26 of FIG. 2. The computing core 96 includes a plurality of processing modules 50, one or more memory controllers 52, a plurality of main memories 54, an input/output (IO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a memory device interface module 73 and a DSN interface module 76. The memory device interface module 73 allows connections to one or more memory devices 90 of the storage unit 36. Each of the plurality of processing modules 50 may be paired with a corresponding one of the plurality of main memories 54. Note each processing module 50 memory 54 pair may be operably coupled to a separate memory controller 52. Further note one or more of the plurality of memory devices may be a nonuniform memory access (NUMA) memory device.

Figure 10:
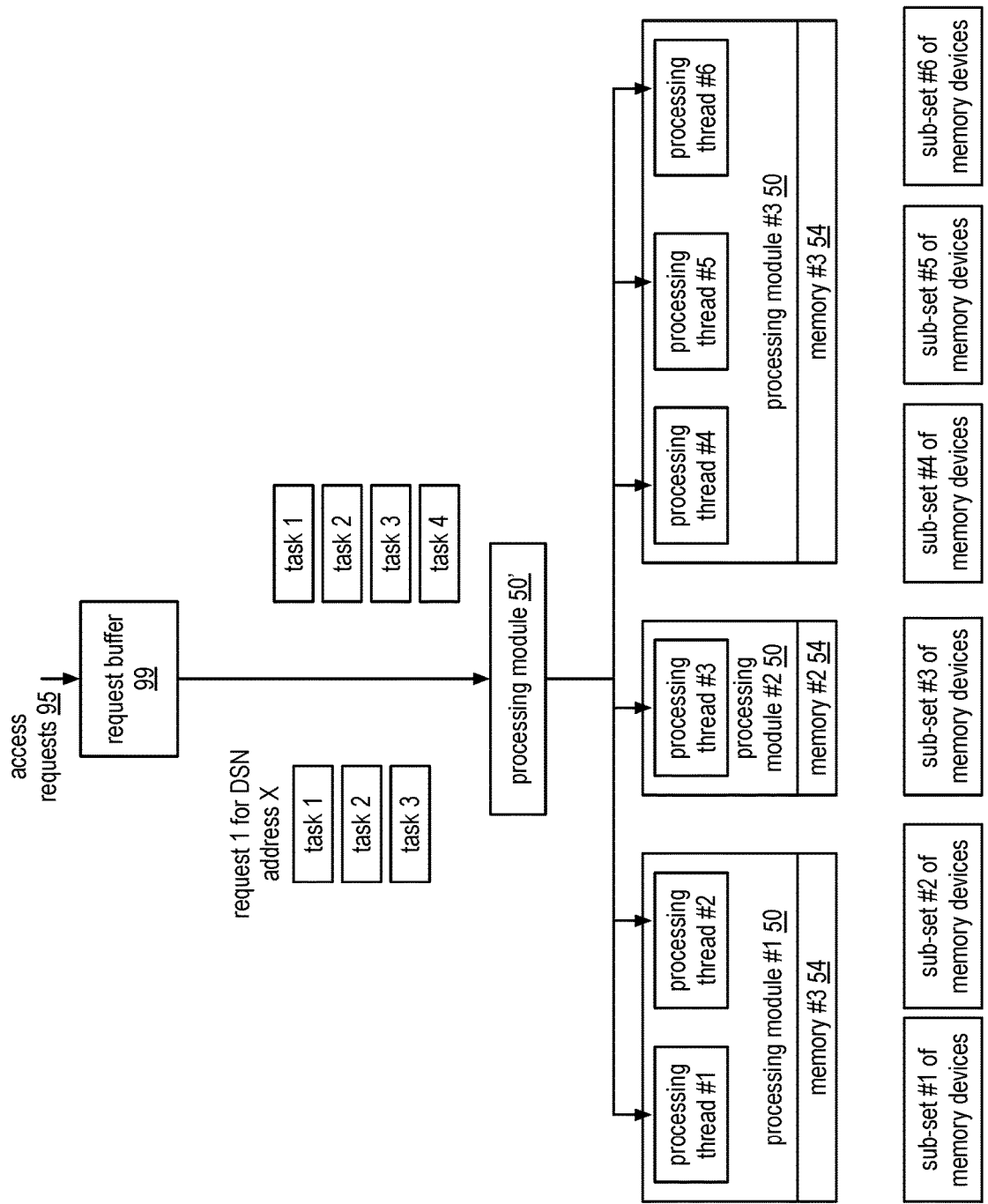
FIG. 10 is a schematic block diagram of an embodiment of processing access requests in accordance with the present invention.

FIG. 10 is a schematic block diagram of an embodiment of a portion of a dispersed storage (DS) unit of FIG. 9 that includes a request buffer 99, a processing module 50', a plurality of processing modules 50, a plurality of processing threads #1-#6, and a plurality of memories 54. Each memory 54 includes one or more memory devices that are arranged into a plurality of sub-sets #1-#6 of memory devices.

In an example, each processing module 50 is paired with a corresponding memory 54 and each processing threads #1-#6 is allocated to a sub-set #1-#6 of memory devices. For example, processing thread #1 is allocated to sub-set #1 of memory devices via processing module #1. As another example, processing thread #2 is allocated to sub-set #2 of memory devices via processing module #1. As a further example, processing thread #3 is allocated to sub-set #3 of memory devices via processing module #2. As yet another example, processing thread #4 is allocated to sub-set #4 of memory devices via processing module #3. As yet a further example, processing thread #5 is allocated to sub-set #5 of memory devices via processing module #3. As a still further example, processing thread #6 is allocated to sub-set #6 of memory devices via processing module #3.

Alternatively, each processing module 50 is paired with a main memory 54, however, each processing thread may not be allocated to a corresponding sub-set of memory devices. As one example, processing thread #1 may access one or more sub-sets #1-6 of memory devices within the DS unit via processing module #1. As another example, processing thread #4 may access sub-set #2 of memory devices within the DS unit via processing module #3. As such, when the DS unit receives an access request, the processing module identifies a processing module 50 main memory 54 pair, and stores data related to the access request in the main memory 54 of the identified processing module 50 main memory 54 pair. Thus, the processing module 50 of the identified processing module 50 main memory 54 pair handles all processing related to the access request.

In an example of operation, a request buffer 99 of the storage unit of FIG. 9 receives access requests 95, wherein an access request includes a logical DSN address and a storage function. The storage function is one of a read request, a write request, a list request, a digest request and a rebuild request regarding an encoded data slice of a set of encoded data slices. The request buffer 99 receives a first request for DSN address X which includes three tasks and a second request for DSN address Y which includes four tasks. The processing module 50' performs logical to physical address conversions of the logical DSN address X and logical DSN address Y to produce physical addresses of memory devices of the storage unit.

The processing module 50' identifies a memory device from the plurality of memory devices based on the physical address resulting from the physical address conversion of the logical DSN addresses. For example, the processing module 50' identifies a memory device is part of sub-set #1 of memory devices based on the physical addresses conversion for the first access request (e.g., request 1 for DSN address X) and identifies a second memory device that is part of sub-set #5 of memory devices the physical addresses conversion for the second access request (e.g., request 2 for DSN address Y).

The processing module 50' then identifies a processing thread of the plurality of processing threads #1-#6 based on allocation of the plurality of processing threads to the plurality of memory devices. For example, for the first access request, the processing module identifies processing thread #1 and for the second access request, the processing module 50' identifies processing thread #5. Each processing thread then executes tasks associated with each access request to fulfill the access requests. For example, processing thread #1 executes tasks 1-3 of the first access request to fulfill the first access request and processing thread #5 executes tasks 1-4 of the second access request to fulfill the second access request. Note that in another example, the same processing module 50 memory 54 pair may process both the first and second access requests (e.g., when the first and second identified memory devices are included in sub-set #4-sub-set #6). Further note that the same processing thread may execute both the first and second access requests (e.g., when the first and second identified memory devices are included in the same sub-set of memory devices). Still further note the processing thread may be identified by the processing module 50 main memory 54 pairing.

Figure 11:
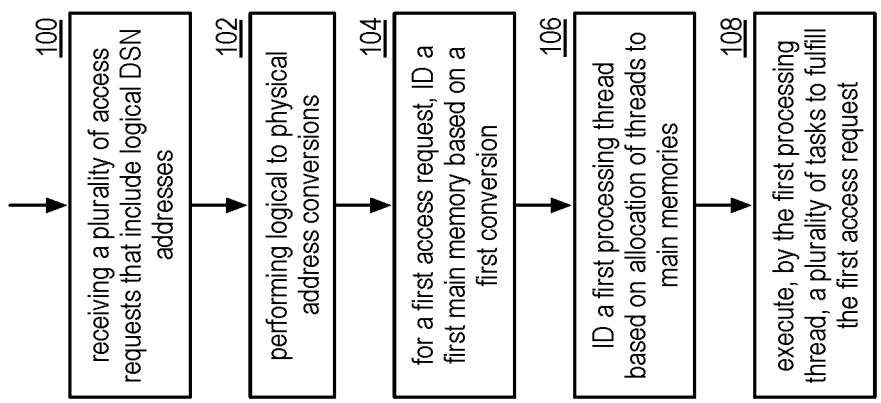
FIG. 11 is a logic diagram of an example of a method of associating a processing thread and memory section to a memory device in accordance with the present invention.

FIG. 11 is a logic diagram of an example of a method of associating a processing thread to a main memory processing module pair. The method begins with step 100, where a storage unit of a dispersed storage network (DSN) receives access requests. The method continues to step 102, where a first processing module of a plurality of processing modules of the storage unit performs logical to physical address conversions of logical DSN addresses of the access requests to produce physical addresses of a plurality of main memories of the storage unit. The method continues with step 104, where the first processing module, for a first access request of the access requests identifies a first main memory from the plurality of main memories based on the physical address resulting from the physical address conversion of a first logical DSN address of the first access request.

The method continues with step 106, where the first processing module identifies a first processing thread of a plurality of processing threads based on allocation of the plurality of processing threads to the plurality of main memories. For example, the allocation of the plurality of processing threads to the plurality of main memories may be performed by allocating the first processing thread to a first main memory of the plurality of main memories. In this example, the first main memory may be paired with a first subset of memory devices of a plurality of memory devices. As another example, the allocation of the plurality of processing threads to the plurality of main memories may be performed by allocating a second processing thread to the first main memory of the plurality of main memories. In this example, the first main memory may be paired with a second subset of memory devices of the plurality of memory devices. As yet another example, the allocation of the plurality of processing threads to the plurality of main memories may be performed by allocating a third processing thread to a second main memory of the plurality of main memories. In this example, the second main memory may be paired with a third subset of memory devices of the plurality of memory devices. The method continues with step 108, where the first processing thread executes a plurality of tasks of the first access request to fulfill the first access request.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A dispersed storage unit, comprising:
   a request buffer which receives an access request;
   a plurality of processing modules; and
   a plurality of memories arranged into a plurality of subsets of memory devices, wherein:
   a processing module of the plurality of processing modules is paired with a corresponding memory device and each processing thread of a plurality of processing threads is allocated to a subset of the plurality of subsets of memory devices by the processing module,
   the processing module identifies a memory device is part of a subset of memory devices based on a physical addresses conversion of a first logical dispersed storage network (DSN) address of an access request to produce physical addresses for the plurality of memories,
   a processing thread of the plurality of processing threads is identified by the processing module pairing with the corresponding memory device; and
   the subsets of memory devices include nonuniform memory access (NUMA) memory devices, wherein:
   a first memory of the plurality of memories is paired with a first subset of the plurality of subsets of memory devices; and
   the processing thread of the plurality of processing threads is allocated by the processing module to the first memory.

2. The dispersed storage unit of claim 1, wherein the access request includes a storage function which comprises one of a digest request and a rebuild request regarding an encoded data slice of a set of encoded data slices.

3. The dispersed storage unit of claim 2, wherein the processing thread of the plurality of processing threads executes tasks associated with the access request.

4. The dispersed storage unit of claim 3, wherein the encoded data slice includes a slice name which includes a pillar number of the encoded data slice, a vault identifier (ID), a data object identifier (ID), and revision level information.

5. The dispersed storage unit of claim 1, wherein the access request includes a storage function which is one of a read request, a write request, a list request, a digest request and a rebuild request regarding an encoded data slice of a set of encoded data slices.

6. The dispersed storage unit of claim 5, wherein the encoded data slice includes a slice name which functions as the first logical DSN address.

7. The dispersed storage unit of claim 6, wherein the encoded data slice includes a slice name which functions as at least part of the first logical DSN address.

8. The dispersed storage unit of claim 7, wherein the encoded data slice is produced from a data segment of a data object.

9. The dispersed storage unit of claim 8, wherein the data segment is encoded with an encoding function to produce the encoded data slice.

10. The dispersed storage unit of claim 9, wherein the encoding function includes an encoding matrix, a data matrix, and a coded matrix.

11. The dispersed storage unit of claim 10, wherein:
    the data segment is divided into a plurality of data blocks;
    the data blocks are arranged into a number of rows with Z data blocks per row;
    the Z data blocks per row is a function of a number of the data blocks created from the data segment and a decode threshold number; and
    a size of the encoding matrix is dependent on a pillar width number and the decode threshold number.

12. The dispersed storage unit of claim 1, wherein
    a second memory of the plurality of memories is paired with a second subset of the plurality of subsets of memory devices; and
    the processing module of the plurality of processing modules is configured to:
    allocate a second processing thread of the plurality of processing threads to the first memory; and
    allocate a third processing thread of the plurality of processing threads to the second memory, wherein the second memory is further paired with a third subset of the plurality of subsets of memory devices.

13. A system comprising:
    a processor, a computer readable memory, one or more computer readable storage media, and program instructions collectively stored on the one or more computer readable storage media, the program instructions executable to:
    receive an access request which includes a logical dispersed storage network (DSN) address;
    pair a processing module of a plurality of processing modules with a memory device of a plurality of memory devices;
    identify a memory device is part of a subset of memory devices based on a physical address conversion of the logical DSN address of the access request; and identify a processing thread which executes tasks associated with the access request by the processing module pairing with the memory device, wherein the program instructions are further executable to:

allocate a first processing thread to a first main memory of a plurality of main memories, wherein the first main memory is paired with a first subset of memory devices of the plurality of memory devices.

14. The system of claim 13, wherein the access request includes a storage function which comprises one of a digest request and a rebuild request regarding an encoded data slice of a set of encoded data slices.

15. The system of claim 14, wherein the encoded data slice includes a slice name which functions as the logical DSN address.

16. The system of claim 13, wherein the program instructions are further executable to:

allocate a second processing thread to the first main memory; and allocate a third processing thread to a second main memory of a plurality of main memories, wherein the second main memory is paired with a second subset of memory devices of the plurality of memory devices, and wherein the second main memory is further paired with a third subset of memory devices of the plurality of memory devices.

17. A computer program product comprising one or more computer readable storage media having program instructions collectively stored on the one or more computer readable storage media, the program instructions executable to:

receive an access request which includes a logical dispersed storage network (DSN) address and a storage function;

pair a processing module of a plurality of processing modules with a memory device of a plurality of memory devices;

identify a memory device is part of a subset of memory devices based on a physical address conversion of the logical DSN address of the access request; and identify a processing thread which executes tasks associated with the access request by the processing module pairing with the memory device, wherein the program instructions are further executable to:

allocate a first processing thread to a first main memory of a plurality of main memories, wherein the first main memory is paired with a first subset of memory devices of the plurality of memory devices.

18. The computer program product of claim 17, wherein the storage function comprises one of a read request, a write request, a list request, a digest request and a rebuild request regarding an encoded data slice of a set of encoded data slices.

19. The computer program product of claim 17, wherein the encoded data slice includes a slice name which includes a pillar number of the encoded data slice, a vault identifier (ID), a data object identifier (ID), and revision level information.

20. The computer programming product of claim 17, wherein the program instructions are further executable to:

allocate a second processing thread to the first main memory; and allocate a third processing thread to a second main memory of a plurality of main memories, wherein the second main memory is paired with a second subset of memory devices of the plurality of memory devices, and wherein the second main memory is further paired with a third subset of memory devices of the plurality of memory devices.

* * * * *